United States Patent [19]

Boquillon et al.

[11] Patent Number: 5,151,134
[45] Date of Patent: Sep. 29, 1992

[54] METHOD AND A DEVICE FOR CLEANING A SURFACE WITH A LASER

[75] Inventors: Jean-Pierre Boquillon, Dijon; Hubert Berger, Saint Apollinaire; Philippe Bresson, Dijon, all of France

[73] Assignee: Agence Regionale de Developpements Technologiques, Dijon, France

[21] Appl. No.: 576,464

[22] Filed: Sep. 14, 1990

[30] Foreign Application Priority Data

Jan. 17, 1989 [FR] France ............................ 8900496

[51] Int. Cl.⁵ ............................................. B08B 3/12
[52] U.S. Cl. ................................. 134/1; 134/22.11; 219/121.76; 219/121.85
[58] Field of Search ....................... 134/1, 22.11; 219/121.85, 121.6, 121.76, 121.77, 121.85; 372/109; 350/96.24, 96.1

[56] References Cited

U.S. PATENT DOCUMENTS

| | | | |
|---|---|---|---|
| 4,368,080 | 1/1983 | Langen et al. | 134/1 |
| 4,564,736 | 1/1986 | Jones et al. | 219/121.6 |
| 4,587,035 | 5/1986 | Kokta . | |
| 4,735,047 | 3/1988 | Cruickshank et al. | 219/121.77 X |
| 4,756,765 | 7/1988 | Woodroffe . | |

Primary Examiner—Theodore Morris
Assistant Examiner—Saeed Chaudhry
Attorney, Agent, or Firm—McAulay Fisher Nissen Goldberg & Kiel

[57] ABSTRACT

Process and device for cleaning pollutants from a surface using a laser for applying laser pulses to the surface to be cleaned, in which the laser is pulsed in pulse durations not exceeding 30 nanoseconds, the area on the surface is contacted with the pulsating laser, the surface is cleaned in the absence of an observably thermal effect, and the laser is removed from the area on the surface after the area is cleaned, the laser beam is manipulated by means of a hand piece, and an optical system is provided to separate the laser beam into a plurality of individual laser beams with energies approximately equal to each other, and guided by an optical fiber assembly together with a recombining of the individual beams into a single laser beam, and the afocal optical assembly for adjusting the diameter of the recombined laser beams.

19 Claims, 2 Drawing Sheets

METHOD AND A DEVICE FOR CLEANING A SURFACE WITH A LASER

The invention relates to a process for cleaning the surface of materials, such in particular as stone, glass, steel, ceramics, wood, paper or cardboard, and to a device for carrying out this process, employing a pulsed laser with short pulses of which the beam is focussed on the surface to be cleaned.

Several processes for cleaning the surface of objects or edifices having been polluted either due to their use in a soiling or aggressive environment or in the course of manufacture thereof in an industrial context, are known at the present time.

Concerning the former case, which covers, in a non-exhaustive manner, the renovation of the surface state of monuments, works of art of the glass, ceramic type or of metal pieces such as coins, bronze, arms and other antique objects, it is known to use mechanical means—such as in particular the projection of pulverulent silica for cleaning stone, or the use of precision mills for removing concretions on small objects—or chemical means, such as for example acids. Now, these techniques are delicate and long to employ, are not economically viable, with no guarantee of perfect cleaning of all the dirt deposited. A more recent process, developed in the laboratory, employs a YAG pulsed power laser, operating in a free-lasing mode, the pulses obtained thus varying from 0.1 milliseconds to about 10 milliseconds.

Such a process is an illustration of the process described in U.S. Pat. No. 4 756 765 which concerns the removal from the surface of a substrate of polluting materials presenting a low heat conduction, such as paints, grease or ceramics; such removal results from a thermal effect and necessitates to that end that the laser beam directed on the surface to be cleaned present a high energy and a pulse duration typically greater than 3 microseconds, so that, after focussing, the energy density (or fluence) is included between 2 $J/cm^2$ and 100 $J/cm^2$. This latter process, although it is employed rathermore to industry than for simply cleaning polluted objects or edifices, employs the same physical phenomena. Substantially identical operational conditions of a laser are found in International Application WO-83/01400, which describes a process more particularly intended for cleaning the hull of ships; the fluence attains a value close to 20 $J/cm^2$, the laser used being typically a $CO_2$ laser or a YAG laser. At lower energy, it has been proposed to eliminate the superficial layer of rust present on the metal surfaces, this process forming the subject matter of French Patent Application No. 2 467 656; the laser used is a $CO_2$ laser, focussed on the surface to be cleaned so that the fluence attains about 5 $J/cm^2$. By this process, the rust is transformed into magnetite; however, as this layer is highly adherent to the surface of the metal treated, it must then be removed by conventional mechanical or chemical means. The same drawback is found in French Patent Application No. 2 300 632; the laser here serves only to heat, suddenly and intensely, the superficial film of oxides present on the surface of metal objects, said film finally being detached from the metallic substrate by a mechanical, chemical or electro-chemical action.

Consequently, all these processes present drawbacks associated with their specificity and they in no way constitute a general, single means for cleaning materials, objects or edifices located in a polluting or industrial environment. Furthermore, these processes remain aggressive means of which it proves difficult to limit the action to the single layer of incrusted dirt. In particular, since the spectra of absorption of the polluting or subjacent materials which are treated, may be very broad or, on the contrary, very narrow, it may be, in many cases, that the wave-length of the laser beam used is inadequate with respect to the desired cleaning; this beam may thus be absorbed not only by the polluting superficial layer to be eliminated, but also by the subjacent material, hence a risk of damaging the latter by heating. In fact, the mean power deposited by the laser beam on the material to be cleaned attains high values when, on the one hand, the laser pulses are long, and, on the other hand, the energy of the pulses and their frequency are too high, which is the case in the processes of the prior art. Finally, in a very specific domain of application, mention may be made of French Patent Application No. 2 525 380, in which it is established that components of nuclear power stations presenting a layer of radioactive oxides may be decontaminated by means of a pulsed laser of intensity sufficient to allow a thermal penetration corresponding to the thickness of the layer of oxides, without damaging the subjacent metal substrate. This latter process is substantially different from the processes previously described, in that, although it recommends the use of fluences greater than 4 $J/cm^2$, normally close to 10 $J/cm^2$, the laser pulses used may also be shorter. Nonetheless, this process presents the drawback of employing a thermal effect of which the risks with respect to the subjacent material have been mentioned above.

It is an object of the present invention to overcome these drawbacks by proposig an alternative to these cleaning processes, using the effect of volatilization of the superficial layers of the material when the latter is subjected to a coherent optical radiation of which the density, in instantaneous power, is sufficient to generate, on the interface of the matter and the outside medium, a shock wave having for its effect to detach at least a part of the polluting superficial layer covering said material.

One should therefore reason here more in terms of power density than in terms of energy density, or fluence, of the laser beam; in fact, the shock wave envisaged by the present invention is due to an instantaneous interaction of a high-power beam with the surface to be cleaned, i.e. it is question of a brief interaction before being energetic. This is why, for example, a laser pulse presenting a high peak followed by a slower decline is quite suitable for carrying out the invention, even if, furthermore, the energy deposited, which is calculated in the conventional manner by integration in the course of time of the instantaneous power, resumes values comparable to those described in the prior art Patents mentioned hereinabove. In the present case, the shock wave can be established only outside any main thermal absorption phenomenon, and it is clear that long and/or too energetic laser pulses must in that case be avoided.

The process according to the invention thus relates to a process for cleaning the surface of materials such as, in particular, stone, glass, steel, ceramics, wood, paper or cardboard, of the type employing a laser beam which is focussed on the surface to be cleaned, characterized in that the "peak power" of the laser used to that end is adjusted to a value included between some hundreds of kilowatts or some tens of megawatts, the diameter of the laser beam on the surface to be cleaned being chosen so as to obtain on this surface a "peak power" density of between some tenths of megawatts per $cm^2$ and some tens of megawatts per $cm^2$.

According to a further feature of the invention, the laser furnishes pulses whose duration may vary between some nanoseconds and some microseconds.

According to another feature, the wave-length of the radiation emitted by this laser lies within the spectrum of absorption of the polluting material, forming a superficial layer on the surface of the material to be cleaned.

Furthermore, as the spectrum of absorption of the polluting material is generally different from the spectrum of absorption of the subjacent material to be cleaned, as the cleaning of the surface of the material advances, less polluted superficial layers appear which are therefore generally more reflecting with respect to the laser radiation; the risks of alteration of the subjacent material are thus virtually non-existent. This effect is particularly well understood in the case of the material to be cleaned being stone, of the granite type, for example.

The case of pickling or descaling materials, in particular metal ones, and more generally of materials of which the spectrum of absorption partly covers that of the polluting material, is identical, but may necessitate, according to a complementary feature of the invention, the use of a laser with variable or tunable emission frequency, of which the emission wave-length may be adjusted continuously or discretely as cleaning progresses, the range of wave-length necessary to that end being a function of the two spectra of absorption. The use of such a laser also renders more efficient the process according to the invention when the spectrum of absorption of the polluting material is very narrow, the tunable laser in that case making it possible to volatilize this material under optimal conditions. Inversely, one may benefit from a "window" of transparency of the subjacent material to be cleaned with respect to certain wave-lengths that may be emitted by the tunable laser used, these wave-lengths being furthermore absorbed by the polluting material; under these conditions, the risk of damage of the subjacent material is clearly reduced.

The use of laser pulses of high instantaneous power therefore constitutes the principal contribution of the process according to the invention; the energy of each pulse thus being fixed, it is then perfectly known that the more the duration of said pulses is reduced, the more their "peak power" is increased. By focussing this available power on the surface to be cleaned with a sufficiently small beam diameter, the power density available is more and more great.

The short duration of the pulses makes it possible to deposit on the material to be cleaned a mean power equal only to some watts or some tens of watts; this power is adjustable if a means for monitoring the repetition frequency of the pulses emitted by the laser is available.

This low mean power required by the process according to the present invention further makes it possible to have available a laser of small dimensions which consumes little energy; even when the operational yield of this laser is low. Lasers with solid amplifier medium, and particularly lasers of the YAG type doped with neodymium, of the sapphire type doped with titanium, and of the alexandrite type, dye lasers or exciplex lasers, may be used, this list being, of course, non-exhaustive.

Other characteristics and advantages of the process according to the invention will appear more readily from the following description of a non-limiting embodiment of this process with reference to the accompanying drawings, in which.

In accordance with a first embodiment of the process according to the invention, a YAG laser with crystal or glass type solid amplifier medium, doped with neodymium is used, operating in Q-switch mode, and consequently furnishing pulses whose duration may vary between about ten nanoseconds and about thirty nanoseconds; in order to be within the operational conditions specific to the process of the invention, the pulse energy is equal at maximum to about 500 millijoules, and the mean diameter of the beam issuing from said laser is smaller than about ten millimeters on the surface to be cleaned.

Such a laser is of reduced dimensions, of the order of a $m^3$, which is advantageous for transport thereof, and its energy supply is conventionally constituted by a cabinet of equivalent dimensions. Consumption is established at about 4 kilowatts per hour under the conditions mentioned above, and choosing a pulse repetition frequency equal to about thirty Hertz. This makes it possible to connect the device to a transportable generator set, particularly adapted to be used on a worksite when cleaning objects or edifices located in a polluted medium, such as statues, historic monuments or other antiques. It is quite possible to envisage the cleaning of other, more ordinary edifices, but its economic interest remains to be demonstrated.

The choice of the operational frequency of the laser is not very important but, according to studies made in the laboratory and on a worksite, it seems that a frequency equal to some tens of Hertz enables the best results to be obtained: in fact, it would appear that this frequency range is suitable for carrying out the process according to the invention of which the following description gives a particular, non-limiting example concerning the cleaning of an outside edifice.

Figure 1:
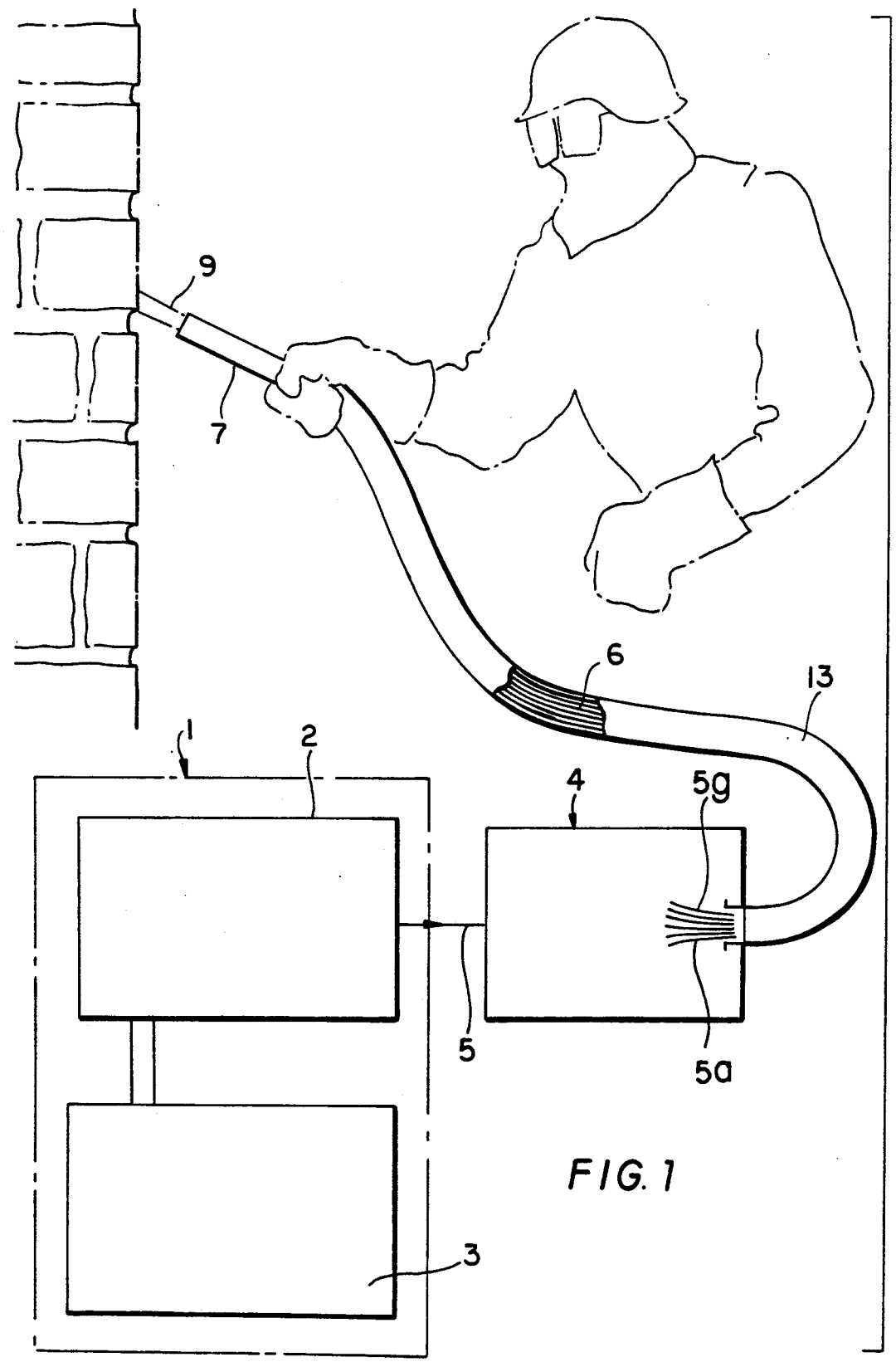
FIG. 1 is a general view of a device for carrying out the process according to the invention, applicable for example to the cleaning of historic monuments.

With reference to FIG. 1, it is the operator who selects the displacement of the focus of the laser beam on the surface to be cleaned, preferably by an automatized displacement, of the optical scanning type, which would have the drawback of provoking a series of repetitive defects, consequences of a spatial heterogeneity in energy of the section of the laser beam, even after focussing thereof on the surface to be cleaned. However, it will be noted that an automatized displacement is useful in other applications of the process of the invention, particularly in an industrial context.

Figure 2:
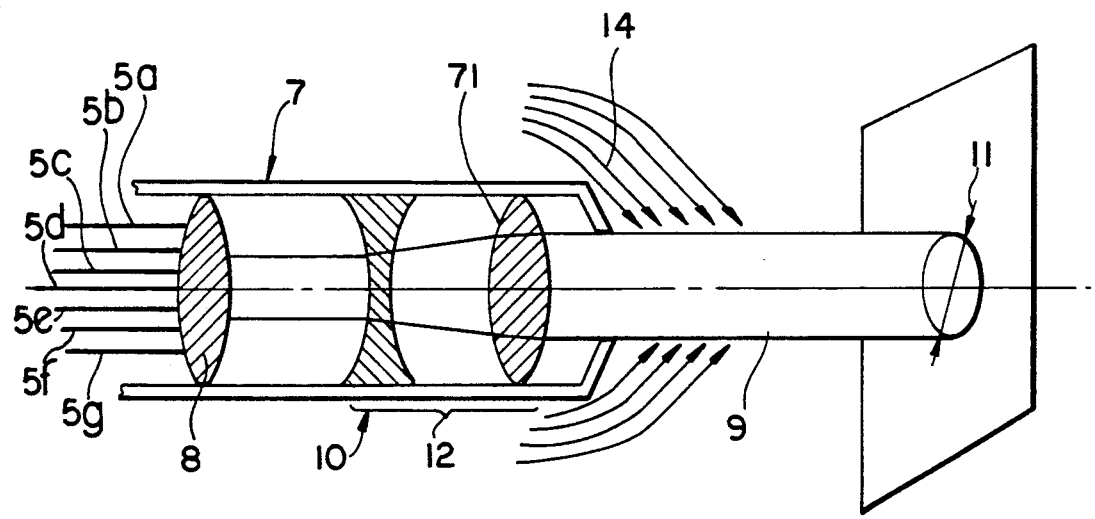
FIG. 2 is a view in elevation of the hand piece as described hereinbelow.
Figure 3:
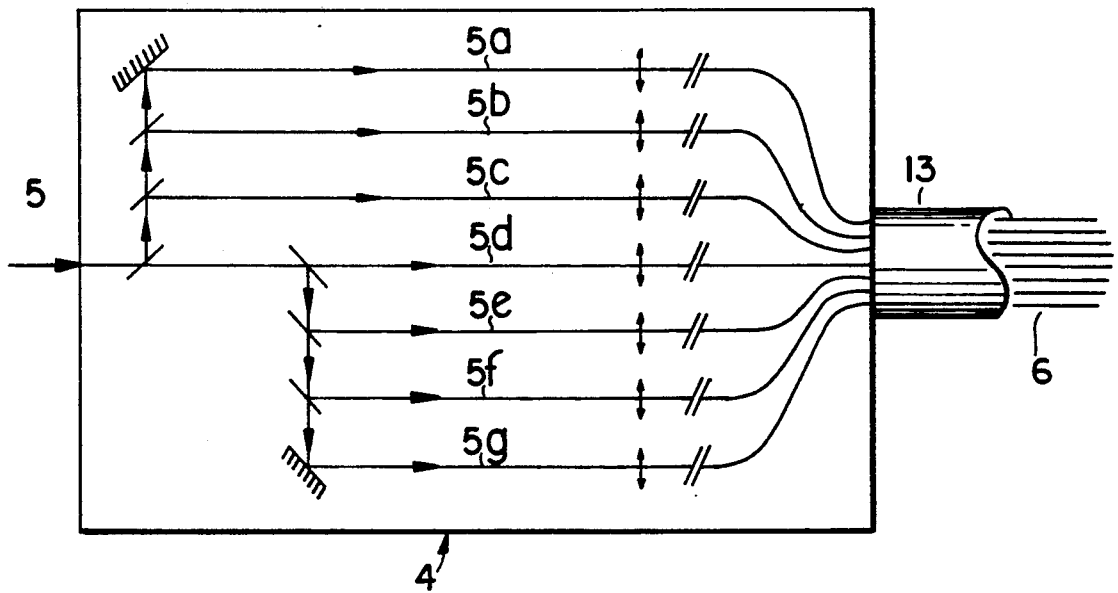
FIG. 3 is a diagram of the optical system for separation of the laser beam as described hereinbelow.

The device for carrying out the process according to the invention, according to FIGS. 1, 2 and 3, is thus well adapted to manual use, reliable and efficient, in that it comprises, on the one hand, a mechanical assembly 1 containing the laser 2 and its electrical supply 3, on the other hand, a box 4, placed on the path of the laser beam 5 issuing from said mechanical assembly 1, and containing an optical system intended to separate the laser beam 5 into a plurality of other laser beams 5a, 5b, 5c, 5d, 5e, 5f and 5g whose energies are approximately equal to one another, said laser beams 5a, 5b, 5c, 5d, 5d, 5f and 5g then being guided, by an optical fiber assembly 6, towards a hand piece 7 comprising an optical means 8 for recombining the laser beams 5a, 5b, 5c, 5d, 5e, 5f, and 5g into a single laser beam 9, and an optical means 10 for adjusting the diameter 11 of said recombined laser beam 9, this second means 10 being, for example, constituted by an afocal optical assembly 12, said hand piece 7 having an adequate size to be easily manipulated by the operator who is cleaning the surface to be cleaned.

The efficiency of such cleaning is thus very high: under current conditions of cleaning of historic stone monuments, it has been estimated possible completely to restore a surface equal to a square meter in one hour, such yield to be compared with the present yield of the mechanical processes projecting pulverulent silica equal, at maximum, to one square meter per day.

An important feature of the device carrying out the process according to the invention concerns the choice of the optical fibers 6 which transmit the laser beams 5a, 5b, 5c, 5d, 5e, 5f and 5g to the hand piece 7. This choice is intimately connected with the choice of the duration of the laser pulses transmitted by these optical fibers 6; in fact, there is a maximum threshold of transmission in "peak power" of a laser beam for each type of fiber. This explains the role of the optical system 6 for separating the laser beam 5 into a plurality of other beams 5a, 5b, 5c, 5d, 5e, 5f and 5g.

The optical fibers used for guiding the laser beams 5a, 5b, 5c, 5d, 5e, 5f and 5g towards the hand piece 7 preferably present a silica core and a cladding of silica or hard silicon. This choice seems to be the only one possible under the present conditions of availability of optical fibers, at least as far as the transport of beams presenting a high peak power is concerned.

It will also be noted that a length of optical fibers of about 30 meters is chosen, which enables the operator to work at a sufficient distance from the fixed elements of the device carrying out the process according to the invention.

Finally, mechanical protection of the optical fibers is provided by a reinforced outer sheath 13, which enables the device to be used on a work site.

Furthermore, it is necessary to protect the whole of the device against the dust resulting from the cleaning made by the laser: near the surface to be cleaned, viz. at about twenty centimeters, the optical outlet face 71 of the hand piece 7 is thus subjected to the aggressions of the dust resulting from the spray of the superficial layer of dirt on the stone. A continuous or discontinuous removal of dust from this optical face 71 is provided by disposing, inside or outside the hand piece 7, a device procuring a jet 14 of a fluid, advantageously air. A compressor supplies this device, the connection between the compressor and the device procuring the jet 14 advantageously being a tube protected by the sheath 13 for reinforcing the fibers 6.

In addition, the box 4 containing the optical system for separating the laser beam 5 into a plurality of beams 5a, 5b, 5c, 5d, 5e, 5f, 5g, is preferably a tight box in which a vacuum is created: this configuration makes it possible efficiently to protect the optical elements of the beam-separating system from the dust. Moreover, it avoids breakdowns resulting from the focussing of the laser beam 5 on dust, located inside the box 4, on the path of said laser beam 5.

Finally, the role of the optical means 10 for adjusting the diameter 11 of the recombined laser beam 9, which lies in the body of the hand piece 7, will be noted. This optical means 10, constituted for example by an afocal optical assembly 12, comprising a divergent lens and a convergent lens, makes it possible, from the same available energy of the laser beam, to obtain a variable "peak power" density: the operator thus has the possibility of varying the efficiency of cleaning as a function of the level of incrustation of dirt that he observes on the surface to be cleaned: by increasing the diameter 11 by means of the optical means 10, he directly varies this efficiency of cleaning.

According to a second embodiment of the process according to the invention, a dye laser or a solid amplifier medium laser of the sapphire doped with titanium type or of the alexandrite type is used. Such lasers are lasers with variable or tunable frequency. Typically, a dye laser thus emits in the visible spectrum, between 500 and 720 nanometers depending on the dye used. The titanium-doped sapphire lasers emit on a wavelength range of from 700 to 1100 nanometers; associated with a frequency doubler, of a well known type for example, using the phenomenon of optical birefrigence induced in a material by an electric field, it is then possible to have available a wavelength range varying from 350 to 550 nanometers. In this way, it is therefore possible, after a prior study of the respective spectra of absorption of the material to be cleaned, and of the polluting material forming a layer on its surface, to choose and adjust the wavelength of emission of the tunable laser used so as to enjoy the optimum conditions of cleaning, i.e. associating the optimum efficiency of absorption of the polluting material with respect to the laser beam, without, nevertheless, deviating from a sufficiently short pulse duration adapted to generate the phenomenon of shock wave characterizing the process of the invention.

A dye laser may thus be used in a free-lasing mode, it in that case emitting pulses of some microseconds, or in Q-switch mode, the pulses in that case lasting some nanoseconds. On the contrary, in the case of solid amplifier medium lasers of a type already mentioned, the pulse durations, vary from 1 to 3 microseconds in "free-lasing mode", and are of some tens of nanoseconds in Q-switch mode (duration comparable, moreover, to the duration of a pulse emitted by a non-tunable solid amplifier medium laser of YAG type operating in accordance with the same mode).

The use of a laser with variable or tunable frequency is particularly interesting in the case of the spectra of absorption of the subjacent material to be cleaned and of the polluting material covering its surface, intersecting; in fact, in that situation, there is a risk of alteration of the subjacent material, which poses problems which are difficult to solve, unless, in accordance with the teachings of French Patent Application No. 2 525 386 mentioned hereinabove, operating conditions of the laser are provided, which are capable of furnishing pulses producing a thermic effect limited by their depth of penetration, during their interaction with the surface to be cleaned or descaled. By using a tunable laser, it is always possible to find an operating wavelength range which escapes the spectrum of absorption of the subjacent material, a wavelength of this range serving either at the beginning of the treatment, if it is correctly absorbed by the polluting material, or progressively, or completely, as the superficial polluted layer is volatilized; in the latter configuration, an adequate monitoring device, with or without feedback, allows this evolution of the laser beam in wavelength.

A particular embodiment of this use of a tunable laser for carrying out the process according to the present invention consists in cleaning tubular products in an industrial environment, either during manufacture thereof, or for the purpose of descaling them after use. The use, in these specific cases, of a tunable laser is not limiting, and it is demonstrated that a YAG laser operating in Q-switch mode under the conditions which have already been mentioned above, was also suitable. In addition, the use of exciplex lasers which emit an ultraviolet radiation has proved interesting, particularly due to the generally vitreous structure of the polluting material to be eliminated from the surface of the tubular products, in accordance with the following description.

Here it is question of scouring, degreasing or, more generally, removing the lubricant products, such as fusible glass or grease, located inside and/or outside tubular products issuing for example from a drawing mill or having been pierced by a mandrel, then expanded or reduced by conventional known means. On leaving the shaping device, i.e. the forging device, the tubes or tubular products are thus very dirty as their production involves lubricants, issuing in particular from reserves placed upstream of the forging device. Up to the present time it was known to remove the lubricant coating from the tubular products by chemical and/or mechanical means of the internal and/or external shot blasting type; such an operation is necessary for certain specific subsequent treatments.

According to the present invention, the lubricant layer and the layer of residual oxides present after the forging of a tubular product, issuing for example from a drawing mill, is eliminated by means of a laser beam scanning at least one of its inner or outer surfaces, the laser used to that end having all the characteristics necessary for obtaining, on the surface of the subjacent solid matter, for example, although not exclusively, made of steel, a shock wave separating said layers, said laser being, furthermore, of the tunable type, or not, as to its emission frequency.

In the same manner, after installation in an industrial environment of a tube polluted by deposits, or subjected to aggressive conditions of use, particularly in thermal stations, it is possible to descale this tube by the same process. The embodiment of the invention necessitates, in that case, the transport of the laser beam up to the vicinity of the chosen zone of interaction, and the advantage procured by the transport of this beam by means of at least one optical fiber, in accordance with the teachings of the present invention as described hereinabove, will be readily appreciated. It should be noted that the use of a tunable laser may considerably simplify the embodiment of the cleaning process; being given, in fact, that it is then possible to effect a better adequation between the wavelength of the laser used and the respective spectra of absorption of the subjacent material to be cleaned, and of the polluting material covering its surface, the laser may be operated at lower energy, which facilitates transport thereof by optical fibers and even makes it possible to use only one optical fiber, or to use a type of fiber other than a fiber of silica or hard silicon.

It is obvious that any embodiment, other than those described hereinabove, of the process of cleaning or of the device for carrying out the process of cleaning according to the invention, would not depart from the scope of the invention if it is executed within the spirit thereof.

The domain of the invention is in particular that of the restoration of works of art, whether it be question of historic monuments, wooden furniture, glass or pottery, and also that of the cleaning of tubes during manufacture thereof, or of their subsequent descaling.

We claim:

1. Process for removing pollutants from a surface of materials selected from the group consisting of stone, glass, steel, ceramics, wood, paper and cardboard, comprising the steps of:
    employing a laser for producing a laser beam comprising laser pulses of high instantaneous pulses which is focused onto the surface to be cleaned;
    pulsing the laser in pulse durations not exceeding 30 nanoseconds;
    contacting the pulsating laser beam with an area on the surface;
    cleaning the surface in the absence of an observable thermal effect to the object; and
    removing the laser from the area on the surface after the area is clean.

2. The process according to claim 1, including:
    using a laser with a variable or tunable emission frequency having an emission wavelength range which is a function of and related to the respective spectra of absorption of the surface and of the polutant covering its surface; and
    adjusting the emission wavelength as cleaning advances to effect an efficient cleaning process while pulsing the laser between 10 to b 30 nanoseconds.

3. The process according to claim 1, wherein a solid amplifier medium laser of the neodymium-doped YAG crystal or glass type operating in Q-switch mode is used, furnishing pulses of which the duration may vary between about ten nanoseconds and about thirty nanoseconds, the maximum energy per pulse being close to 500 millijoules, and the diameter of the beam issuing from said laser having a diameter smaller than about ten millimeters on the surface to be cleaned.

4. The process according to claim 1, wherein the object is a tubular product having an inner surface.

5. The process according to claim 4, wherein the laser is a tunnel laser.

6. The process according to claim 5, wherein the surface to be cleaned is the inner surface of the tubular product.

7. A process for removing pollutants from a surface of an object by employing a laser for producing a laser beam which is focused onto the surface to be cleaned, comprising the steps of:
    using a solid amplifier medium laser of the neodymium-doped YAG crystal or glass type operating in Q-switch mode;
    choosing the diameter of the laser beam applied to the surface to be cleaned to obtain a peak power density between 0.1 megawatts per $cm^2$ and 100 megawatts per $cm^2$ on the surface to be cleaned;
    pulsing the laser in pulse durations between 10 and 30 nanoseconds, and in which the maximum energy per pulse is close to 500 millijoules, and the diameter of the beam issuing from said laser having a diameter smaller than about ten millimeters on the surface to be cleaned;
    contacting the pulsating laser beam with an area on the surface to be cleaned;

cleaning the surface in the absence of an observable thermal effect to the object; and removing the laser from the area on the surface after the area is clean.

8. The process according to claim 7, including:

using a laser with a variable or tunable emission frequency having an emission wavelength range which is a function of and related to the respective spectra of absorption of the surface and of the pollutant covering its surface; and adjusting the emission wavelength as cleaning advances to effect an efficient cleaning process while varying the pulse between 0.1 to 10 milliseconds.

9. The process according to claim 7, including using a dye laser.

10. The process according to claim 7, wherein the object is a tubular product having an inner surface.

11. The process according to claim 7, wherein the laser is a tunnel laser.

12. The process according to claim 7, wherein the surface to be cleaned is the inner surface of the tubular product.

13. Device for cleaning pollutants from a surface, comprising:

a mechanical assembly 1 containing a laser 2 for producing a laser beam 5 and an electrical supply 3 for said laser;

a hand-piece 7 sized for manipulation by an operator cleaning the surface of pollutants coupled with said laser beam 5;

a box 4 between said hand-piece and placed in the path of the laser beam 5 emitted from said mechanical assembly and including an optical system for separating the laser beam into a plurality of individual laser beams 5a, 5b, 5c, 5d, 5e, 5f, 5g with energies approximately equal to one another;

means including an optical fiber assembly 6 for guiding said laser beams 5a, 5b, 5c, 5d, 5e, 5f, 5g towards said hand-piece 7, said last-mentioned means including optical means 8 for recombining said laser beams into a single recombined laser beam 9; and optical means 10 for adjusting the diameter 11 of said recombined laser beam 9, said optical means 10 comprising an afocal optical assembly 12, said a focal optical assembly includes a divergent lens and a convergent lens.

14. The device according to claim 13, wherein said optical fibers 6 used for guiding said laser beams 5a, 5b, 5c, 5d, 5e, 5f, 5g towards said hand-piece 7 have a core of silica and a cladding of silica or hard silicon, and the length of said optical fibers is about 30 meters.

15. The device according to claim 13, wherein said hand-piece 7 includes an optical outlet face 71, and including means for making a jet 14 of a fluid disposed relative to said hand-piece 7 for effecting removal of dust from the optical outlet face 71.

16. The device according to claim 14, wherein said optical means is variable for varying the efficiency of cleaning.

17. The device according to claim 13, wherein said hand-piece 7 has an optical outlet face 71, and including means for making a jet 14 of a fluid disposed relative to said hand-piece 7 for effecting removal of dust from said optical outlet face 71.

18. The device according to claim 17, wherein said optical fibers 6 used for guiding said laser beams 5a, 5b, 5c, 5d, 5e, 5f, 5g towards said hand-piece 7 comprise a core of silica and a cladding of silica or hard silicon.

19. The device according to claim 13, wherein said optical means is variable for varying the efficiency of cleaning.

* * * * *

UNITED STATES PATENT AND TRADEMARK OFFICE
CERTIFICATE OF CORRECTION

PATENT NO. : 5,151,134
DATED     : September 29, 1992
INVENTOR(S) : Jean-Pierre Boquillon, Hubert Berger and Philippe Bresson It is certified that error appears in the above-identified patent and that said Letters Patent is hereby corrected as shown below:

On the Title page : should read the following:

[22] PCT Filed:        Jan. 17, 1990

[86] PCT No.:          PCT/FR90/00037
     § 371 Date:       Sep. 14, 1990
     § 102(e) Date:    Sep. 14, 1990

[87] PCT Pub. No.:     WO90/07988
     PCT Pub. Date:    Jul. 26, 1990

Signed and Sealed this

Twenty-third Day of November, 1993

Attest:

BRUCE LEHMAN

Attesting Officer          Commissioner of Patents and Trademarks